United States Patent
Chesley

(10) Patent No.: US 7,129,888 B1
(45) Date of Patent: Oct. 31, 2006

(54) HIGH SPEED WEIGHTING SIGNAL GENERATOR FOR SIDELOBE CANCELLER

(75) Inventor: Donald Edward Chesley, Maple Shade, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1826 days.

(21) Appl. No.: 07/922,391

(22) Filed: Jul. 31, 1992

(51) Int. Cl.
*G01S 13/00* (2006.01)

(52) U.S. Cl. .................. 342/159; 342/378; 367/87; 367/905

(58) Field of Classification Search .............. 342/195, 342/159–169, 175, 378–389; 367/905, 87–116; 364/724.01, 724.03
See application file for complete search history.

(56) References Cited

U.S. PATENT DOCUMENTS

| | | | | |
|---|---|---|---|---|
| 4,217,586 A | * | 8/1980 | McGuffin | 380/378 X |
| 4,688,187 A | * | 8/1987 | McWhirter | 342/381 X |
| 4,941,117 A | | 7/1990 | Yuen | 364/724.07 |
| H1005 H | * | 12/1991 | Gerlach | 342/378 |

OTHER PUBLICATIONS

"Time and Order Recursive Multichannel Adaptive Filtering Techniques," Ph. D dissertation by Yuen, University of Pennsylvania, 1988.
USPTO disclosure document H1005, "Gram-Schmidt Space-Time Adaptive Filter Using Transverse Orthonormal Ladder Filters," published Dec. 3, 1991, Gerlach.

* cited by examiner

*Primary Examiner*—Bernarr E. Gregory
(74) *Attorney, Agent, or Firm*—Duane Morris, LLP

(57) ABSTRACT

A sidelobe canceller for a transducer arrangement such as an antenna or sonar transducer uses a main transducer and one or more auxiliary transducers. The auxiliary received signals are weighted by FIR filters or by multipliers, and the weighted auxiliary signals are summed, and the summed, weighted auxiliary signals are subtracted from the main signal to produce the desired low-sidelobe main signal. The weighting signals are generated in conventional manner from intermediate weighted signals. The intermediate weighting signals are produced by a reduced-hardware arrangement. When FIR filters are used, the signals being multiplied by weights include mutually delayed samples.

3 Claims, 12 Drawing Sheets

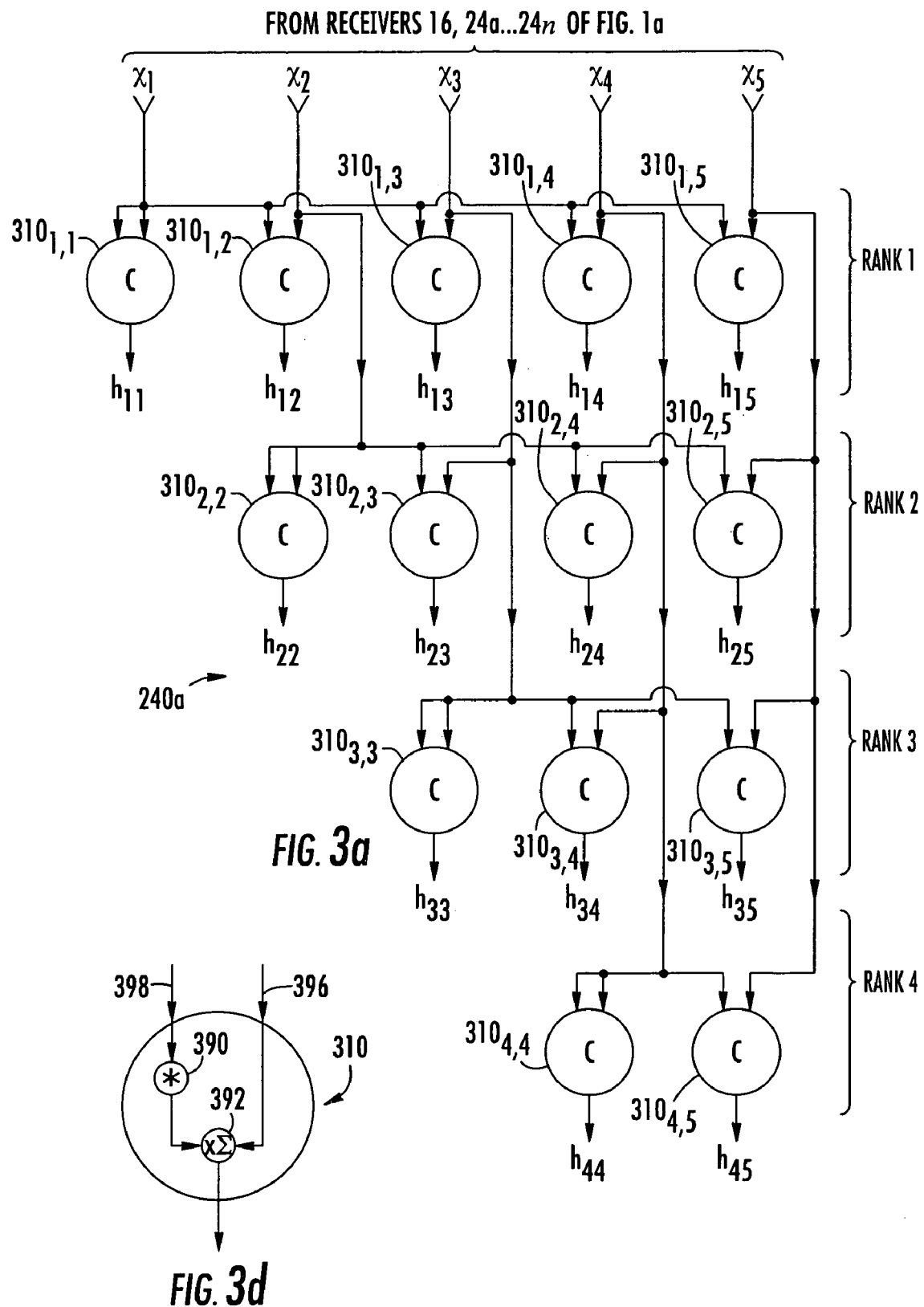

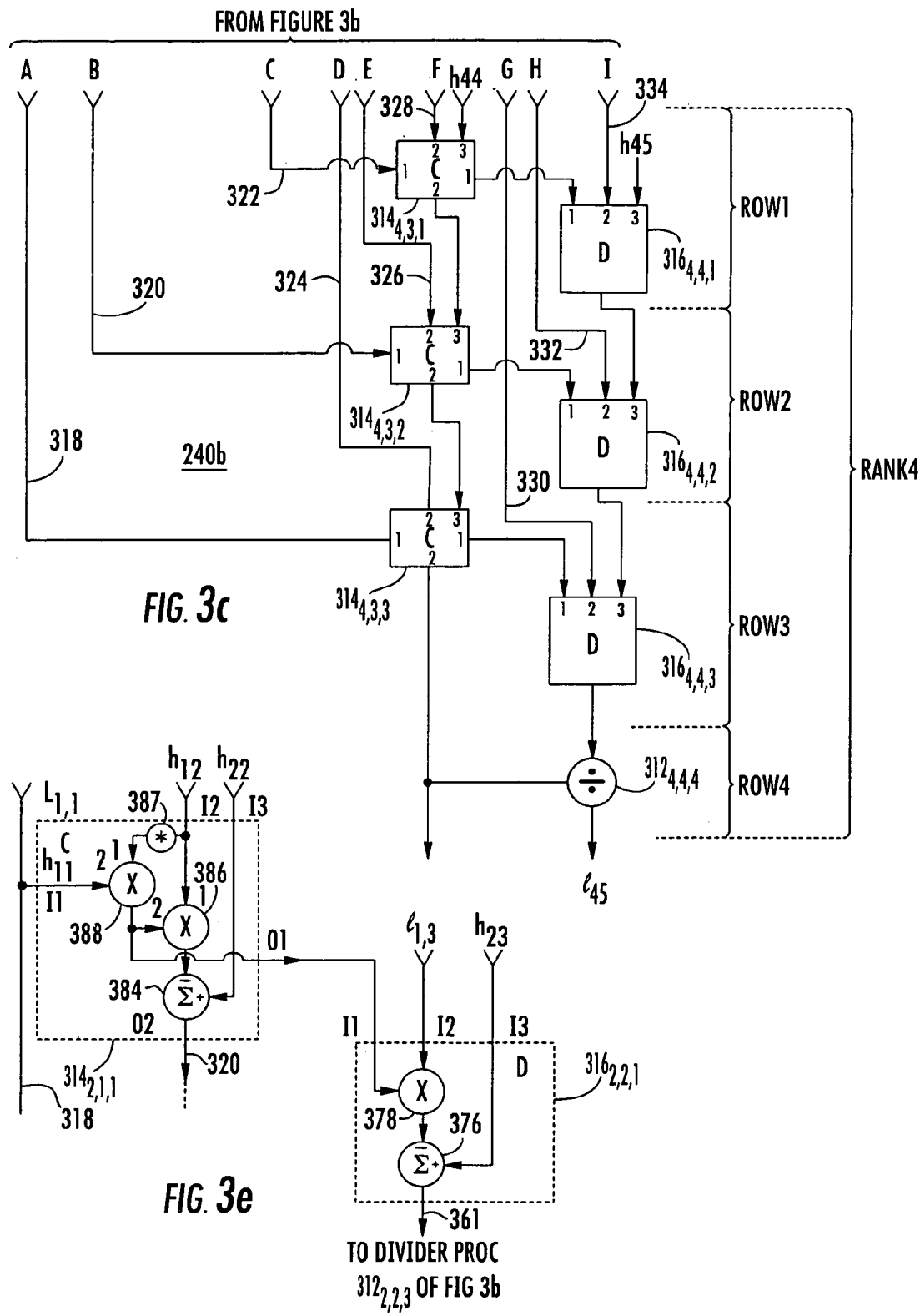

HIGH SPEED WEIGHTING SIGNAL GENERATOR FOR SIDELOBE CANCELLER

BACKGROUND OF THE INVENTION

This invention relates to sidelobe cancellers for sensing systems such as radar and sonar, and more particularly to improved weight determination arrangements which reduce redundant processes and thereby allow higher operating speed, reduced or simplified weight determination hardware, or both.

FIG. 1 is a simplified block diagram of a radar system in accordance with the invention. In FIG. 1, a first or main antenna 10 is coupled by a diplexer 12 to a transmitter (TX) 14 and to a receiver 16. Main antenna 10 produces a receive "beam" designated as 18, which includes a main lobe 20, and also includes a plurality of sidelobes 22 by which energy may be received from directions other than the main lobe. Representative first and second ancillary or auxiliary antennas $24_a \ldots 24n$ are located near main antenna 10, and respond generally to signal from the direction of the main lobe and from other directions. Each auxiliary antenna $24a \ldots 24n$ is coupled to an individual receiver, illustrated as receivers $28a \ldots 28m$. The receivers amplify, frequency convert, and perform analog-to-digital conversion, and other known functions as may be required to produce signals representative of amplitude and phase. The received signals from main receiver 16 are coupled to a delay (D) 30, and to the noninverting (+) input port of a summing circuit 32. The received signals from receivers $28a \ldots 28m$ are applied to input ports of finite impulse response (FIR) filters $34a \ldots 34p$ associated with the receivers.

The received signals from auxiliary receivers $28a \ldots 28m$ of FIG. 1a are also applied over buses $29a \ldots 29s$ to a plurality of delay lines illustrated as blocks $38a \ldots 38r$. Representative delay line 38a is illustrated in FIG. 1c, and uses a cascade of delay elements represented as shift registers (S) 138a, 138b, and 138c to produce four time-sequential samples of the received signals on output data paths $a^1$, $a^2$, $a^3$, $a^4$ of a of bus 39a for application to weighting signal generator 40 of FIG. 1a. Weighting signal generator 40 processes the $a^1 \ldots a^4$ sequential signal samples from delay 38a, the $u^1 \ldots u^4$ sequential signal samples from delay 38r, other sets of sequential signal samples from other ones of the delays 38 (not illustrated), and the single delayed main signal sample from delay 30, to produce intermediate weighting signals on data paths $36a \ldots 36g$. The intermediate weighting signals on paths $36a \ldots 36p$ are processed in processor 50 to form weighting coefficients. The weighting coefficients are applied over buses $35a \ldots 35q$ to FIR filters $34a \ldots 34p$. FIR filters $34a \ldots 34p$ filter the complex received signals received over paths $29a \ldots 29s$ from receivers $28a \ldots 28m$ under the control of weighting signals, received over buses $35a \ldots 35q$ from weighting signal processor 50. The FIR filters filter the auxiliary signals originating from auxiliary antennas $24a \ldots 24n$. The filtered auxiliary signals are applied from FIR filters $34a \ldots 34p$ to a summing ($\Sigma$) circuit illustrated as a block 42. The summed, filtered auxiliary signals are applied from summing circuit 42 to the inverting (−) input of summing circuit 32, where they are subtracted from the main signal to produce on data path 52 the desired signal, which represents the main lobe signals in which the unwanted signals arriving from directions other than that of main lobe 20 as suppressed.

FIG. 1b illustrates details of representative FIR filter 34a of FIG. 1a. In FIG. 1b, each FIR filter includes a tapped delay line, multipliers and a summer which together provide frequency response shaping to improve cancellation performance. In FIG. 1b, a tapped delay 134 includes shift registers 110, 112 and 114, which delay the signal from receiver 28a of FIG. 1a. A set of four multipliers 120, 122, 124 and 126 is coupled to receive mutually delayed signal samples from delay line 134. Each multiplier receives an independent weighting coefficient over bus 36a from weighting signal processor 50. As a result, the same signal sample moves in sequence from multiplier to multiplier within FIR filter 34a of FIG. 1b. More specifically, each undelayed sample arriving on path 17 is applied to multiplier 120 or multiplication by a first weighting coefficient. At the next clock cycle, shift register 110 stores the sample and makes it available to multiplier 122, and a new sample arrives at the input of shift register 110 and is applied to multiplier 120. During succeeding clock cycles, the original sample moves from shift register to shift register within delay line 134, being applied in succession to input ports of multipliers 120, 122, 124 and 126, and being multiplied therein by one of the weighting coefficients. At any moment, the sum signal generated at the output of summing circuit 128 of FIG. 1b is the sum of a plurality of time-sequential samples of the received auxiliary signals, each multiplied by a different one of the weighting coefficients (although one or more of the weighting coefficients may happen to have the same value).

FIG. 2a is a simplified block diagram of a radar system similar to that of FIG. 1a, but in which simple multipliers are used instead of FIR filters. Elements of FIG. 2a corresponding to those of FIG. 1a are designated by the same reference numerals. In FIG. 2a, weighting signal generator 240 has fewer input ports than weighting signal generator 40 of FIG. 1a, and consequently has fewer levels of calculation, but is otherwise identical. The intermediate weighting signals produced by weighting signal generator 240 of FIG. 2c are applied over data paths $236a \ldots 236q$ processor 50, which generates the desired weighting coefficients for application to multipliers $234a \ldots 234p$ for multiplying the auxiliary received signals. The multiplied auxiliary received signals are applied to summing circuit 42, and the summed, weighted auxiliary signals are subtracted from the main signal in summing circuit 32.

FIG. 2b is a simplified block diagram of intermediate weighting signal generator 240 of FIG. 2a. Weight generator 240 of FIG. 2b is illustrated for the case in which a single input signal or vector $x_5$ originating from main antenna 10 of FIG. 2b is received by way of receiver 16, together with four auxiliary signals $x_1$, $x_2$, $x_3$ and $x_4$ originating from auxiliary antennas $28a \ldots 28m$. The arrangement of FIG. 2b is similar to, but not identical with that described at Chapter 4 in the *Doctoral Dissertation in Electrical Engineering* entitled, *"Time and Order Recursive Multichannel Adaptive Filtering Techniques,"* by Stanley Man Fung Yuen, presented to the faculties of the University of Pennsylvania in 1988.

It should initially be noted that the structure of weighting signal generator 240 of FIG. 2b can be used to directly generate the desired main signal free of the signals from unwanted directions. This is accomplished by, in the structure of FIG. 2b, taking signal $x_5$ to be the main signal, and $x_1$–$x_4$ to be the auxiliary signals. In the arrangement of FIG. 2b, the main signal $x_5$ is ultimately decorrelated or orthogonalized with the $x_1$, $x_2$, $x_3$ and $x_4$ vectors. The $x_1$, $x_2 \ldots x_5$ signals are applied to a first row of processors including processors designated A and B, described further in relation to FIG. 2c. The outputs from Row 1 are residues $q_2^1$ to $q_5^1$, which are used as inputs to the next row of decorrelators. Each residue q represents an input vector x decorrelated or orthogonalized from one or more of the other vectors x. For example, $q_2^1$ produced by B processor $212_{1,2}$ represents vector $x_2$ decorrelated from vector $x_1$. Similarly, residue $q_3^2$ produced at the output of B processor $212_{2,3}$ represents vector $x_3$ decorrelated from vectors $x_1$ and $x_2$. This iterative process continues until the last residue is obtained, which in this case is $q_5^4$, which is the residue of the main signal vector $X_5$ which has made orthogonal to the remainder of the input vectors $x_1 \ldots x_4$. Residue $q_5^4$ is made available on a path 208 of FIG. 2a and may be directly applied to further processing and display devices (not illustrated) rather than the difference signal from data path 52.

For the simple, illustrative case of FIG. 2b, taking the desired signal from conductor 208 may be appropriate. However, as mentioned below, it may be desirable to use weighting signals generated as intermediate products in the structure of FIG. 2b to produce the weighting signals for multipliers 234a–234p of FIG. 2a. As part of their operation, each B processor produces an intermediate weighting coefficient $l_{xy}$, where subscript x describes the row, and subscript y describes the column.

More particularly, in FIG. 2b, the $x_1$ auxiliary signal is applied as an input to A processor $210_1$, and to an input port of each of B processors $212_{1,2}$, $212_{1,3}$, $212_{1,4}$ and $212_{1,5}$. Auxiliary signal $x_2$ is applied to another input port of B processor $212_{1,2}$, auxiliary signal $x_3$ is applied to another input port of B processor $212_{1,3}$, and auxiliary signal $x_4$ is applied to another input port of B processor $212_{1,4}$. Main signal $x_5$ is applied to another input port of B processor $212_{1,5}$. A processor $210_1$ and B processors $212_{1,2} \ldots 212_{1,5}$ are included within a first row (Row 1) of generator 240. In Row 1, the processed output of A processor $210_1$, which is designated $L_{1,1}$, is applied to further input ports of each of B processors $212_{1,2}$, $212_{1,3}$, $212_{1,4}$ and $212_{1,5}$ of Row 1. The B processors of Row 1 of FIG. 2a produce intermediate weighting coefficients l and residues q. The residue produced by main B processor $212_{1,5}$ is designated $q_5^1$, which is applied to an input of a B processor $212_{2,5}$ of Row 2. Processor $212_{1,2}$ of Row 1 produces a residue designated $q_2^1$ which is applied to the input of an A processor $210_2$ of Row 2, and to inputs of B processors $212_{2,3}$, $212_{2,4}$, $212_{2,5}$ of Row 2. The residue produced by Row 1 B processor $212_{1,3}$ is designated $q_3^1$, which is applied to an input port of Row 2 B processor $212_{2,3}$. The output signal produced by Row 1 B processor $212_{1,4}$ is designated $q_4^1$, and is applied to an input port of Row 2 B processor $212_{2,4}$.

In Row 2 of FIG. 2b, the output signal of A processor $210_2$, which is designated $L_{2,2}$, is applied to input ports of B processors $212_{2,3}$, $212_{2,4}$, $212_{2,5}$. The Row 2 B processors $212_{2,3}$, $212_{2,4}$, and $212_{2,5}$ each produce a residue. These residues are designated $q_3^2$, $q_4^2$, and $q_5^2$, respectively. In FIG. 2b, residue $q_3^2$ produced by B processor $212_{2,3}$ of Row 2 is applied to the input port of A processor $210_3$ of Row 3, and to input ports of B processors $212_{3,4}$ and $212_{3,5}$ of Row 3. Residue $q_4^2$ produced by B processor $212_{2,4}$ of Row 2 is applied to an input port of B processor $212_{3,4}$ of Row 3. Residue $q_5^2$ produced by B processor $212_{2,5}$ of Row 2 is applied to an input port of B processor $212_{3,5}$ of Row 3. Also within Row 3, the output, designated $L_{3,3}$ produced by A processor $210_3$ is applied to further input ports of B processors $212_{3,4}$ and $212_{3,5}$. B processors $212_{3,4}$ and $212_{3,5}$ of Row 3 produce residues $q_4^3$ and $q_5^3$, respectively.

The $q_4^3$ residue produced by B processor $212_{3,4}$ of Row 3 of FIG. 2b is applied to the input port of A processor $210_4$ of Row 4, and to B processor $212_{4,5}$. The $q_5^3$ residue produced by B processor $212_{3,5}$ of Row 3 is applied to another input of B processor $212_{4,5}$ of Row 4. Also in Row 4, the output signal, designated $L_{4,4}$, of A processor $210_4$ is applied to an input port of B processor $212_{4,5}$. B processor $212_{4,5}$ produces the final desired residue $q_5^4$, which is the residue of the main signal vector $x_5$ which has been made orthogonal to the rest of the input vectors.

As so far described, the arrangement of FIG. 2b generates the desired orthogonalized main signal. When the process of cancellation must be applied to large numbers of range cells, the above-described method may not be efficient, and may introduce speed limitations.

An alternative method for using the structure of FIG. 2b in the radar system of FIG. 2a is to ignore the signal on data path 208, and use only a subset of the range cells to generate weighting signals in the arrangement of FIG. 2a, which are then applied to the multipliers of FIG. 2a for all range cells. To generate the weights in this manner, sets of intermediate weighting coefficients designated generally as 1 are derived from weighting signal generator 240 of FIG. 2b. An intermediate weighting coefficient designated $1_{xy}$ is generated in each B processor during generation of the residues, where subscript x represents the row in which the B processor is located, and subscript y represents the column. These intermediate weighting coefficients are extracted in sets at each row of the structure of FIG. 2b, and are further processed in processor 50 to produce the weights which are applied to multipliers 234a . . . 234p of FIG. 2a. The processing required in processing block 50 of FIG. 2b to form the weighting coefficients from the intermediate weight coefficients for application to multipliers 234a . . . 234p is well known in the art and is described in, for example, the aforementioned Yuen dissertation. This technique uses some of the range cells to produce weighting coefficients which are applied to the signals of all the range cells, thereby reducing the amount of processing.

FIG. 2c illustrates details of the A and B processors of FIG. 2b. More particularly, for definiteness, FIG. 2c illustrates representative A processor $210_1$ of FIG. 2b, and B processor $212_{1,2}$.

In FIG. 2c, the $x_1$ auxiliary signal is applied in batches to a first input port of a summing multiplier (XΣ) 222 of a processor $210_{1,1}$ and to a processing block 220 designated by an asterisk (*) for taking the complex conjugate of input signal $x_1$. The complex conjugate is applied to a second input port of summing multiplier 222. Such processing circuits are well known in the art, and are described, for example, in U.S. Pat. No. 4,941,117 issued Jul. 10, 1990 in the name of Yuen. The output signal $L_{1,1}$, produced by A processor $210_1$ of FIG. 2c is applied to an input port 233 of B processor $212_{1,2}$, together with the $x_1$ auxiliary signal applied to input port 232 and the $x_2$ auxiliary signal applied to input port 231.

In B processor $212_{1,2}$ of FIG. 2c, the $x_1$ signal applied to input port 232 is applied to a delay circuit or buffer 240 and to a complex conjugate processor 238, which produces the complex conjugate of $x_1$ and applies it to an input port of summing multiplier 258. The $x_2$ auxiliary signal input is applied to an input of a delay or buffer circuit 244, and to a second input of summing multiplier 258. Summing multiplier 258 takes the sum of products, and applies the result to the input of a dividing (÷) circuit 246, where the signal from summing multiplier 258 is divided by the $L_{1,1}$ signal applied to input port 233 of B processor $212_{1,2}$. The divided signal, designated $l_{1,2}$ is applied to a multiplier 242, where it is multiplied by the delayed $x_1$ signal from buffer 240, to produce a signal which is applied to the inverting (−n) input port of a summing circuit 248. The non-inverting input port of summing circuit 248 receives delayed $x_2$ signal from buffer 244, and combines it with the output of multiplier 242 to produce at an output port 254 of B processor $212_{1,2}$ a residue signal $q_2^1$ for application to other processors as described in conjunction with FIG. 2b. The divided signal $1_{1,2}$ produced at the output of dividing circuit 246 is the desired intermediate weighting signal produced by B processor $212_{1,2}$. Each of the other B processors of Row 1 of weighting signal generator 240 of FIG. 2b produces its own intermediate weighting coefficient, and taken together, the four weighting coefficients $1_{1,2}, 1_{1,3}, 1_{1,4}$ and $1_{1,5}$ produced by the B processors of Row 1 constitute one set of intermediate weighting coefficients.

Similarly, the three intermediate weighting coefficients $1_{2,y}$ of Row 2 of FIG. 2b are extracted as one set, the two $1_{3,y}$ of Row 3 constitute one set, and the set of Row 4 includes the single intermediate weighting coefficient $1_{4,5}$.

The system of FIGS. 2a, 2b and 2c produces both the desired orthogonalized residue signals q, and the intermediate weighting coefficients $1_{x,y}$, which can also be used to produce weighting signals for generating orthogonalized signals. Thus, the arrangement produces more information than the minimum required to produce the desired result. It would be desirable to reduce the amount of processing to produce the desired weight signals.

A further inefficiency exists when the scheme of FIGS. 2b and 2c is used in an arrangement such as that of FIG. 1a. When used to process sets of auxiliary signals such as $a^1 \ldots a^4; \ldots; u_1 \ldots u^4$; of FIG. 1a, the processing arrangement of FIG. 2b treats all its inputs as independent, even though the signals of any set of inputs (e.g. $a^1 \ldots a^4$) are merely mutually delayed from each other, as described below in conjunction with FIG. 5. Thus, in the context of FIG. 1a, a weighting signal generator 40 operating as described in conjunction with FIG. 2b performs more than the minimum amount of processing. In such a case, the input signals to weighting signal generator 240 of FIG. 2b may be processed to take advantage of the time relationship of the signals in the shift registers of the FIR filters.

SUMMARY OF THE INVENTION

A sidelobe signal canceler receives input signals from a main transducer and from one or more auxiliary transducers, which may be antennas or sonic or other transducers, and produces correlation signals among the various input signals. An intermediate weighting signal generator produces intermediate weighting signals from the correlation signals for application to a weighting signal generator. The weighting signal generator produces weighting signals for application to weighting signal FIR filters or simple multipliers, in which the received auxiliary signals are each multiplied by one or more weights, to produce weighted signals. The weighted auxiliary signals are summed, and the sum is subtracted from the main signal to eliminate sidelobe signals.

In an embodiment in which weighting is performed by means of an FIR filter, the auxiliary signals being weighted are delayed in the filter to produce sequential samples. The intermediate weighting signal generator in that embodiment may include a plurality of correlator arrays, each receiving the main and auxiliary signals. Each correlator array performs correlations among the signals applied thereto (and delayed versions thereof) and a different one of the applied signals, to produce a plurality of correlation signals, some of which are autocorrelation signals. Another embodiment simplifies the FIR filter to a simple multiplier. This embodiment includes ranks of correlators which receive input signals from the main transducer and from the auxiliary transducers. Within each rank, one correlator receives a particular auxiliary signal at both inputs, and acts as autocorrelator. Also within each rank, the particular auxiliary signal is applied as one input to all other correlators, and either the main signal or one of the other auxiliary signals is applied as the other input, to produce ranks of correlation signals. Corresponding ranks of associated processors include a row of dividers in each rank, and in ranks other than the first rank also include rows of C and D processors. At least one C processor of each rank receives the autocorrelation coefficient from the corresponding rank of correlators, and the D processors of one row of each rank receive the other correlation coefficients from the corresponding rank of correlators. Outputs of C and D processors of each rank other than the first rank are applied to inputs of dividers for directly producing intermediate weighting functions. The intermediate weighting functions are further processed, and applied to multipliers or FIR filters which process the auxiliary signals to produce weighted auxiliary signals. The weighted auxiliary signals are summed, and the sum is subtracted from the main signal to eliminate sidelobe signals.

DESCRIPTION OF THE DRAWING

FIG. 1b is a simplified block diagram of an FIR filter of FIG. 1a, and FIG. 1c is a simplified block diagram of a delay of FIG. 1a;

FIG. 6b is a simplified block diagram illustrating a portion of the correlator arrangement of FIG. 6a.

DESCRIPTION OF THE INVENTION

In FIG. 3a, a plurality of correlators are arranged in ranks and columns, with decreasing numbers of correlators in lower ranks. As illustrated in FIG. 3a, highest Rank 1 includes five correlators $310_{1,1}$, $310_{1,2}$, $310_{1,3}$, $310_{1,4}$ and $310_{1,5}$. The correlators of Ranks 2, 3 and 4 are similarly designated, with the first subscript representing the correlator's Rank and the second subscript designating the column.

Figure 3B:
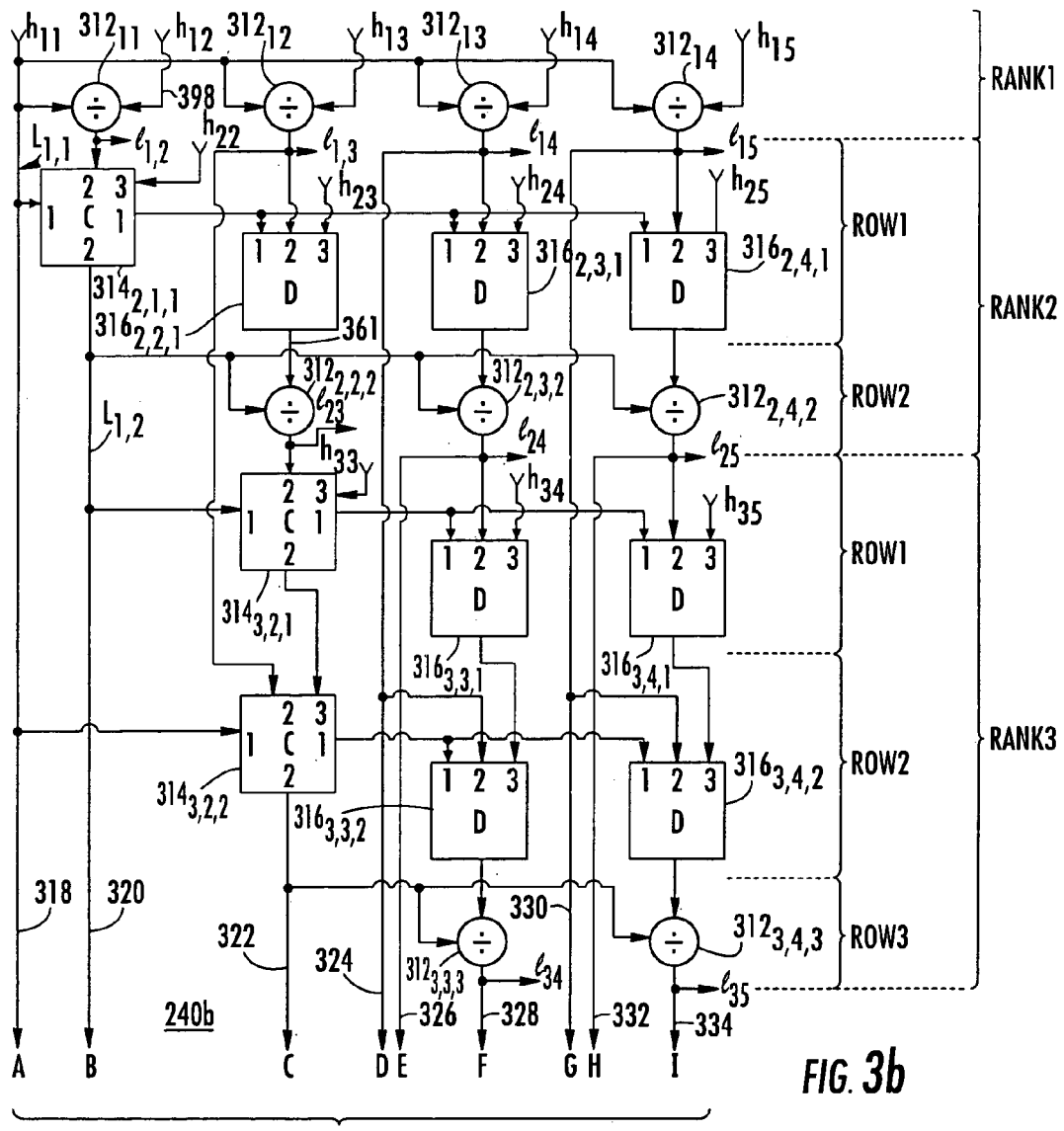
FIG. 3a is a simplified diagram of an array of correlators in accordance with the invention, which may be used as part of an apparatus for generating intermediate weighting signals in the arrangements of FIG. 1a or 2a, and FIGS. 3b and 3c together are a simplified block diagram of an array of processors used in conjunction with the correlators of FIG. 3a to form the apparatus which generates intermediate weighting signals.

Received, delayed auxiliary signal vector $x_1$ is applied to both input ports of correlator $310_{1,1}$ of FIG. 3a, and to one input port of each of the other correlators $310_{1,y}$ of Rank 1. Delayed main signal vector $x_5$ is applied to an input port of correlator $310_{1,5}$, and to an input port of each of the other correlators $310_{2,5}$, $310_{3,5}$, and $310_{4,5}$ of column 5. Received, delayed, auxiliary signal $x_2$ is applied to an input port of correlator $310_{1,2}$ of Rank 1, to both input ports of correlator $310_{2,2}$, and to one input port of each of the other correlators $310_{2,y}$ of Rank 2. Received, delayed, auxiliary signal $x_3$ is applied to an input port of correlators $310_{1,3}$ of Rank 1, and correlator $310_{2,3}$ of Rank 2, to both input ports of correlator $310_{3,3}$ of Rank 3, and to an input port of each of the other correlators $310_{3,4}$ and $310_{3,5}$ of Rank 3. Delayed, received input signal $x_4$ is applied to an input port of correlators $310_{1,4}$, $310_{2,4}$ and $310_{3,4}$ of Ranks 1, 2 and 3, respectively, to both input ports of correlators $310_{4,4}$ of Rank 4, and to an input port of the remaining correlator of Rank 4, namely correlator $310_{4,5}$. Each of the correlators produces a signal $h_{x,y}$ representing the correlation of the two input signals; in the cases of correlators $310_{1,1}$, $310_{2,2}$, $310_{3,3}$, and $310_{4,4}$ which receive the same signal at both input ports, the correlation output signals are autocorrelation signals. The correlation signals $h_{x,y}$ produced by the array of correlators of FIG. 3a are made available to the structure of FIGS. 3b and 3c.

FIG. 3d is a simplified block diagram of a representative correlator 310 of FIG. 3a. In FIG. 3d, a first input signal path 398 is coupled to a circuit 390 designated by an asterisk (*), which represents a circuit for generating the complex conjugate of the input signal. the complex conjugate is applied from circuit 390 to an input of a summing multiplier (x$\Sigma$) 392, and the signal from input data path 396 is applied to the second input of summing multiplier 392. The output signal from summing multiplier 392 is the sum of the product of the signal applied to path 396 multiplied by the complex conjugate of the signal applied to data path 398.

In FIGS. 3b and 3c, dividing processors 312, "C" processors 314, and "D" processors 316, are arrayed in Ranks 1, 2, 3, 4 and 5. Within each rank, processors 312, 314 and 316 are arranged in rows. The number of rows increases with increasing rank; Rank 1 has only one row, Rank 2 has two rows, Rank 3 has three rows, and Rank 4 has four rows. The number of columns of processors within a row decreases with increasing rank. Row 1 of Rank 1 contains four processors, Row 2 of Rank 2 contains three divider processors, and Row 3 of Rank 3 contains two processors. Within each Rank, the last row is a row of divider processors 312. Thus, Rank 1 has only one row, and that row is a row of divider processors 312. Rank 2 has two rows, the second or last of which is a row of divider processors 312, and Rank 3 has 3 rows, the last row of which is a row of dividers. The desired intermediate weighting coefficients ($l_{x,y}$) are produced in sets at the outputs of the last row of processors, namely the row of divider processors, of each rank. Thus, Rank 1 as illustrated in FIG. 3b produces a set of four intermediate weighting coefficients $l_{1,2}$, $l_{1,3}$, $l_{1,4}$ and $l_{1,5}$, while Rank 4 (FIG. 3c) produces a set of one intermediate weighting coefficients, namely intermediate weighting coefficient $l_{4,5}$.

More specifically, in FIG. 3b, divider processor $312_{1,1}$ receives $h_{11}$ and $h_{12}$ signals, and divides $h_{12}$ by $h_{11}$ to produce $l_{1,2}$, which is applied to an input port 2 of a C processors $314_{2,1,1}$, which is described in more detail below.

In the designation $314_{2,1,1}$, the first subscript designates the Rank, the second subscript designates the column, and the third subscript denotes the row which the processor occupies within the rank. Thus, C processor $314_{2,1,1}$ is in the second rank, first column, and occupies a portion of the first row within the second rank. C processor $314_{2,1,1}$ receives $h_{22}$ at its input port 3 from a correlator of Rank 1 of FIG. 3a, and also receives $h_{11}$, redesignated as $L_{1,1}$, at its input port 1. C processor $314_{2,1,1}$ includes output ports designated 1 and 2. Output port 1 of C processor $314_{2,1,1}$ is connected to input ports 1 of each of D processors $316_{2,2,1}$, $316_{2,3,1}$, and $316_{2,4,1}$.

Input port 2 of each D processor $316_{2,2,1}$, $316_{2,3,1}$ and $316_{2,4,1}$ of Row 1 of Rank 2 of FIG. 3b is connected to the corresponding divider processor $312_{1,2}$, $312_{1,3}$, $312_{1,4}$, respectively, of the previous rank, to receive the intermediate weighting coefficients $l_{1,3}$, $l_{1,4}$ and $l_{1,5}$, respectively, produced thereby. Each D processor $316_{2,2,1}$, $316_{2,3,1}$ and $316_{2,4,1}$, of Row 1 of Rank 2 also has its input port 3 coupled to receive $h_{23}$, $h_{24}$ and $h_{25}$, respectively, from Rank 2 of the correlators of FIG. 3a. The outputs from D processors $316_{2,2,1}$, $316_{2,3,1}$ and $316_{2,4,1}$ are applied to input ports of divider processors $312_{2,2,2}$, $312_{2,3,2}$ and $312_{2,4,2}$, respectively, and D processor output signal in each divider processors is divided by a $L_{1,2}$ signal produced on conductor 320 by output port 2 of C processor $314_{2,1,1}$. Divider processors $312_{2,2,2}$, $312_{2,3,2}$ and $312_{2,4,2}$ of FIG. 3b produce the set of desired intermediate weighting coefficients $l_{23}$, $l_{24}$ and $l_{25}$ for application to processor 50 of FIG. 1a, and which are also applied as inputs to the C and D processors of Row 1 of Rank 3 of FIG. 3b.

Processor Rank 3 of FIG. 3c includes three rows. The first row includes C processor $314_{3,2,1}$ and D processors $316_{3,3,1}$ and $316_{3,4,1}$. C processor $314_{3,2,1}$ of Rank 3, Row 1 receives at its input port 1 the $L_{1,2}$ signal from output port 2 of C processor $314_{2,1,1}$, by way of path 320. C processor $314_{3,2,1}$ also receives at its input port 2 the $l_{23}$ intermediate weighting coefficient from divider processor $312_{2,2,2}$, and receives correlation coefficient $h_{33}$ at its input port 3. The output port 1 signal from C processor $314_{3,2,1}$ is applied in common to input ports 1 of Row 1, Rank 3 D processors $316_{3,3,1}$ and $316_{3,4,1}$. Input ports 2 of Row 1, Rank 3 D processor $316_{3,3,1}$ and $316_{3,4,1}$ receive $l_{24}$ and $l_{25}$, respectively, from the divider processors 312 of the next higher rank, namely Rank 2. Input ports 3 of Rank 3, Row 1 D processors $316_{3,3,1}$ and $316_{3,4,1}$ receive correlation coefficients $h_{34}$ and $h_{35}$, respectively, from Rank 3 of the correlators of FIG. 3a.

Row 2 of Rank 3 of FIG. 3b includes one C processor and two D processors, the same as Row 1. C processor $314_{3,2,2}$ of Rank 3 receives the $L_{1,1}$ signal from path 318 at its input port 1, the $l_{1,3}$ intermediate weighting coefficient from divider processor $312_{1,2}$ at its input port 2, and the output port 2 signal from Row 1 C processor $314_{3,2,1}$ at its input port 3. The output port 1 signal is applied in common to input ports 1 of Row 2 D processors $316_{3,3,2}$ and $316_{3,4,2}$. Input port 3 of D processor $316_{3,3,2}$ receives signal from the output port of D processor $316_{3,3,1}$ in the previous row, and input port 3 of D processor $316_{3,4,2}$ receives signal from the output port of D processor $316_{3,4,1}$.

Row 3 of Rank 3 of FIG. 3b includes divider processors $312_{3,3,3}$ and $312_{3,4,3}$, which receive signal from the output ports of D processors $316_{3,3,2}$ and $316_{3,4,2}$ of Row 2, and which also receive divisor signals from output port 2 of C processors $314_{3,2,2}$ of Row 2. Divider processors $312_{3,3,3}$ and $312_{3,4,3}$ of Row 3 of Rank 3 together produce the set of intermediate weighting coefficients $l_{34}$ and $l_{35}$, which are made available to processor 50 of FIG. 1a, and which are also applied to input ports 2 of C processor $314_{4,3,1}$ and D processor $316_{4,4,1}$, respectively, which are located in Row 1 of Rank 4. C processor $314_{4,3,1}$ also receives at its input port 1 the signal from output port 2 of C processor $314_{3,2,2}$, and at its input port 3 the $h_{44}$ correlation coefficient from Rank 4 of FIG. 3a. The signal at output port 1 of C processor $314_{4,3,1}$ of Row 1 of Rank 4 is applied to input port 1 of Row 1 D processor $316_{4,4,1}$. Input port 2 of D processor $316_{4,4,1}$ receives the $l_{35}$ intermediate weighting coefficient from divider processor $312_{3,4,3}$, and input port 3 receives correlation coefficient $h_{45}$ from correlator Rank 4 of FIG. 3a.

The signal from output port 2 of Row 1, Rank 4 C processor $314_{4,3,1}$ of FIG. 3c is applied to input port 3 of Rank 4, Row 2 C processor $314_{4,3,2}$, and the output signal from Row 1 D processor $316_{4,4,1}$ is applied to input port 3 of Row 2 D processor $316_{4,4,2}$. Input port 1 of Row 2 C processor $314_{4,3,2}$ receives $L_{1,2}$ signal from output port 2 of C processor $314_{2,1,1}$ of FIG. 3b, and input port 2 of Row 2 C processor $314_{4,3,2}$ receives, by way of path 326, the $l_{24}$ intermediate weighting coefficient from Row 2 Rank 2 divider processor $312_{2,3,2}$. Input port 1 of Row 2, Rank 4 D processor $316_{4,4,2}$ is coupled to receive signal from output port 1 of Row 2 C processor $314_{4,3,2}$, input port 2 of Row 2, Rank 4 D processor $316_{4,4,2}$ is coupled to receive, by way of path 332, the $l_{25}$ intermediate weighting coefficient from Row 2, Rank 2 divider $312_{2,4,2}$, and input port 3 of Row 2, Rank 4 D processor $316_{4,4,2}$ is coupled to the output port of Row 1 D processor $316_{4,4,1}$.

In Rank 4, Row 3 of FIG. 3c, C processor $314_{4,3,3}$ has its input port 1 coupled, by way of path 318, to receive the $L_{1,1}$ signal, its input port 2 coupled, by way of path 324, to receive intermediate weighting coefficient $l_{14}$ from Rank 1 divider $312_{13}$, and its input port 3 coupled to the output port 2 of Rank 3, Row 2 C processor $314_{4,3,2}$. Also in Rank 4, Row 3 of FIG. 3c, D processor $316_{4,4,3}$ has its input port 1 coupled to output port 1 of C processor $314_{4,3,3}$, to input port 2 coupled, by way of path 330, to receive intermediate weighting coefficient $l_{15}$ from Rank 1 divider processor $312_{14}$, and its input port 3 coupled to the output of Rank 4, Row 2 D processor $316_{4,4,2}$.

In Row 4 of Rank 4 of FIG. 3c, divider processor $312_{4,4,4}$ divides the output of Row 3 D processor $316_{4,4,3}$ by the output port 2 signal of C processor $314_{4,3,3}$, to produce intermediate weighting coefficient $l_{45}$. As mentioned, the intermediate weighting coefficients are coupled in sets from the divider processors of FIGS. 3b and 3c to processor 50 of FIG. 1 to produce the final weighting coefficients as described in the aforementioned Yuen dissertation.

FIG. 3e is a simplified block diagram illustrating details of the C and D processors of FIGS. 3b and 3c. For definiteness, C processor $314_{2,1,1}$ and D processor $316_{2,2,1}$ of FIG. 3b are shown. In FIG. 3e, C processor $314_{2,1,1}$ includes a first multiplier 386, which receives correlation coefficient $h_{12}$ at its first input port. A second multiplier 388 receives at its first input port, the complex conjugate (*) of $h_{12}$ from a circuit 387. Multiplier 388 also receives $L_{1,1}$, signal (which is renamed autocorrelation coefficient $h_{11}$) at its second input port, and produces a product, which is applied to the second input port of multiplier 386, and which is also coupled by way of first output port (O1) of C processor $314_{2,1,1}$ to the first input port (I1) of D processor $316_{2,2,1}$. The output signal from multiplier 386 of C processor $314_{2,1,1}$ of FIG. 3e is applied to an inverting (−) input port of a summing circuit 384, and autocorrelation coefficient $h_{22}$ is from input port I3 applied to its noninverting (+) input port. The sum signal produced at the output port of summing circuit 384 is made available at output port 2 (O2) of C processor $314_{2,1,1}$ and is coupled onto path 320.

D processor $316_{2,2,1}$ of FIG. 3e includes a multiplier 378 which has a first input port I1 coupled to receive signal from output port O1 of C processor $314_{2,1,1}$, and a second input port I2 coupled to receive intermediate weighting coefficient $l_{1,3}$. Multiplier 378 produces product signals, which are applied to the inverting input port of a summing circuit 376, which also receives at its noninverting input port the $h_{23}$ correlation coefficients applied to input port I3. Summing circuit 376 produces sum signals for application by way of data path 361 to divider processor $312_{2,2,2}$ of FIG. 3b.

Figure 2A:
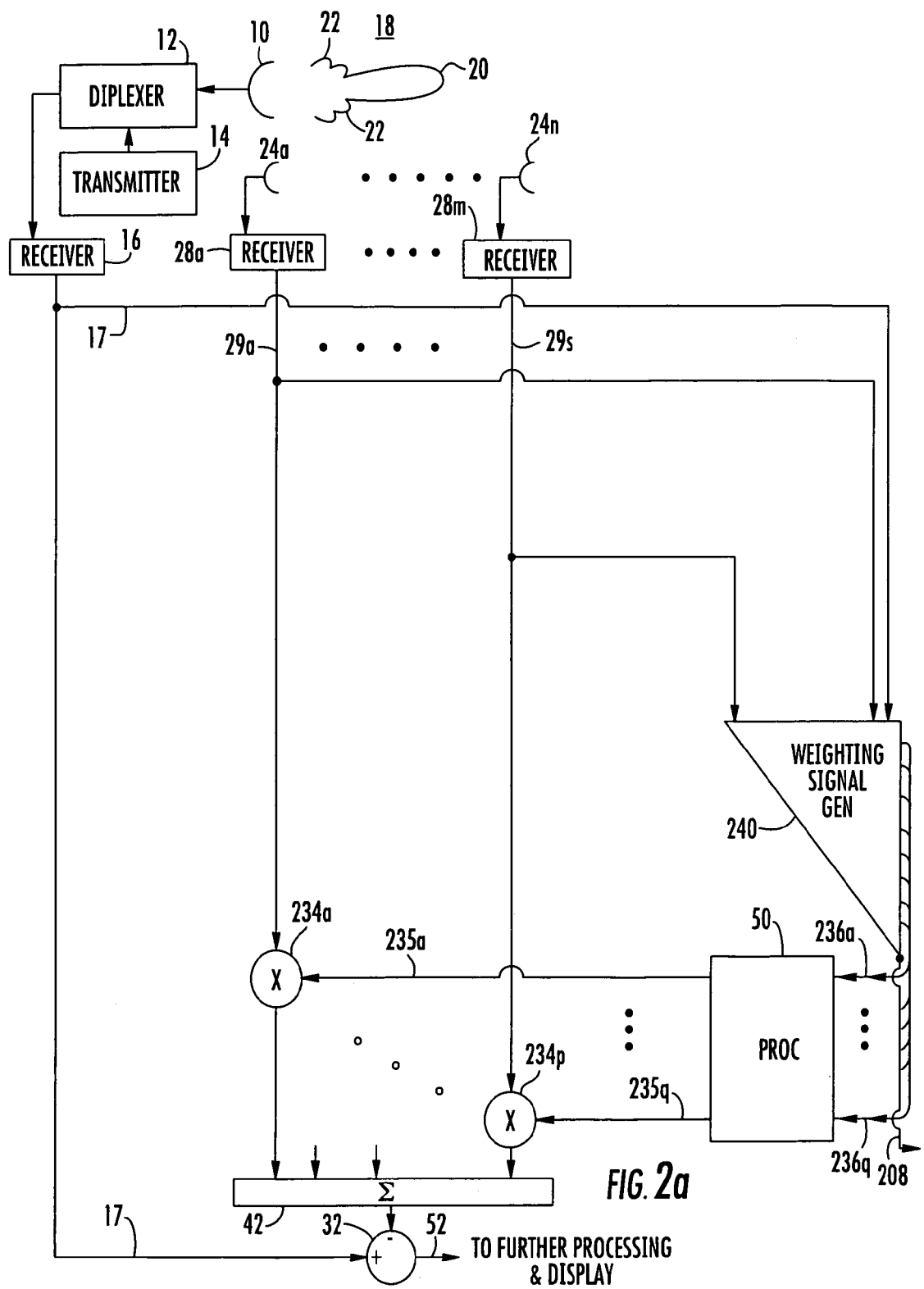
FIG. 2a is a simplified block diagram of a system similar to that of FIG. 1a, in which multipliers are substituted for the FIR filters, and in which center delays are dispensed with, FIG. 2b is a simplified block diagram of a weighting signal generator which may be used in the arrangements of FIGS. 1a and 2a, and FIG. 2c is a simplified block diagram of processors of FIG. 2b.
Figure 2B:
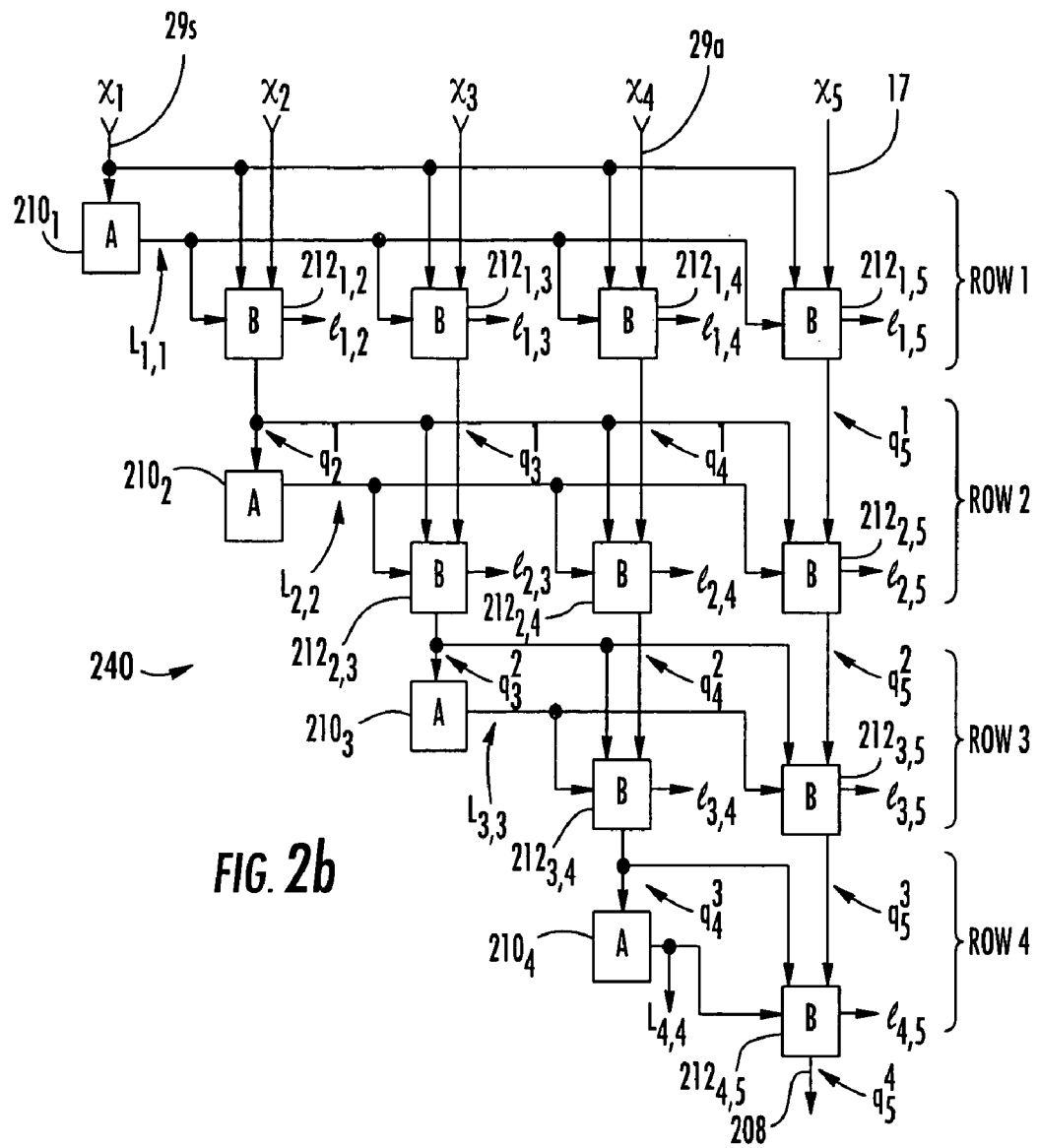
Figure 2C:
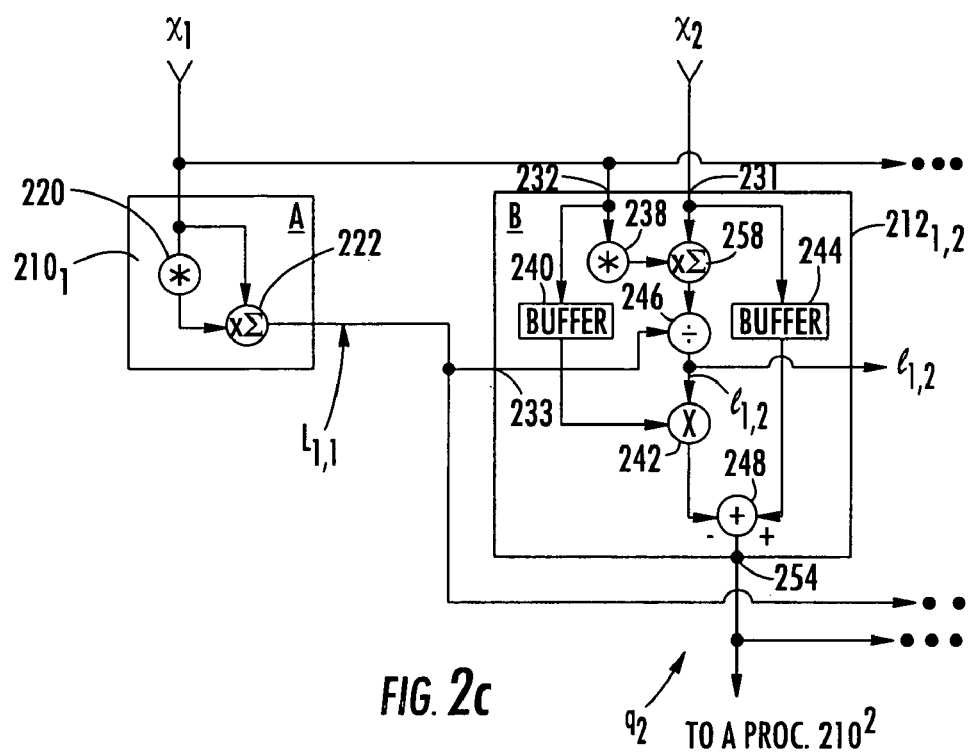

The arrangement of FIGS. 3a, 3b, 3c, 3d and 3e reduces the number of computations required to produce the desired intermediate weighting coefficients by comparison with the arrangement of FIGS. 2b and 2c. In the case of ten input vectors, each with a length of 100 range cells, the improved arrangement requires 576 multiplies and 468 additions, compared with 4500 and 4500. This saving results from not calculating residues.

Figure 1A:
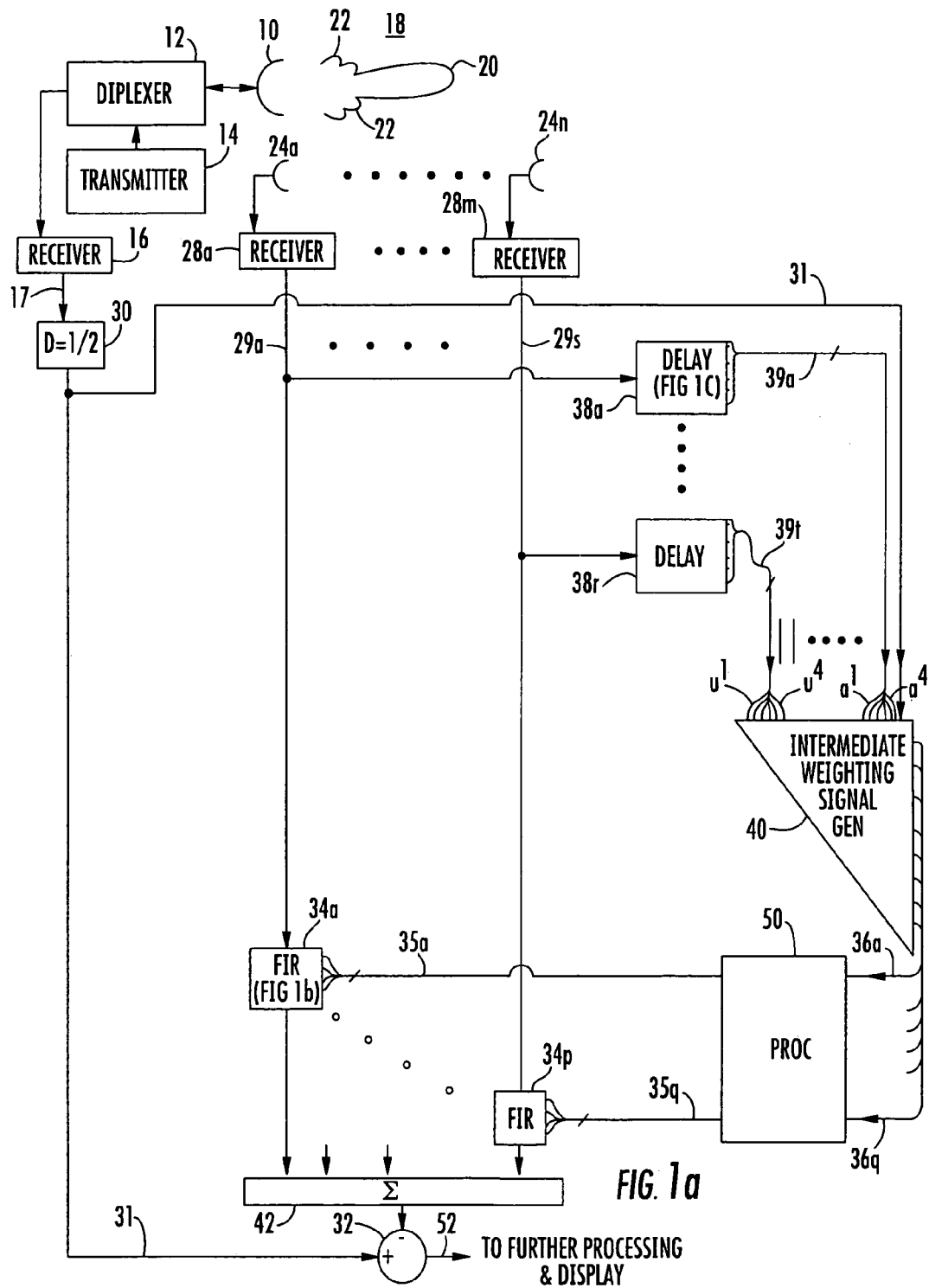
FIG. 1a is a simplified block diagram of a radar system including delays and FIR filters.
Figure 1B:
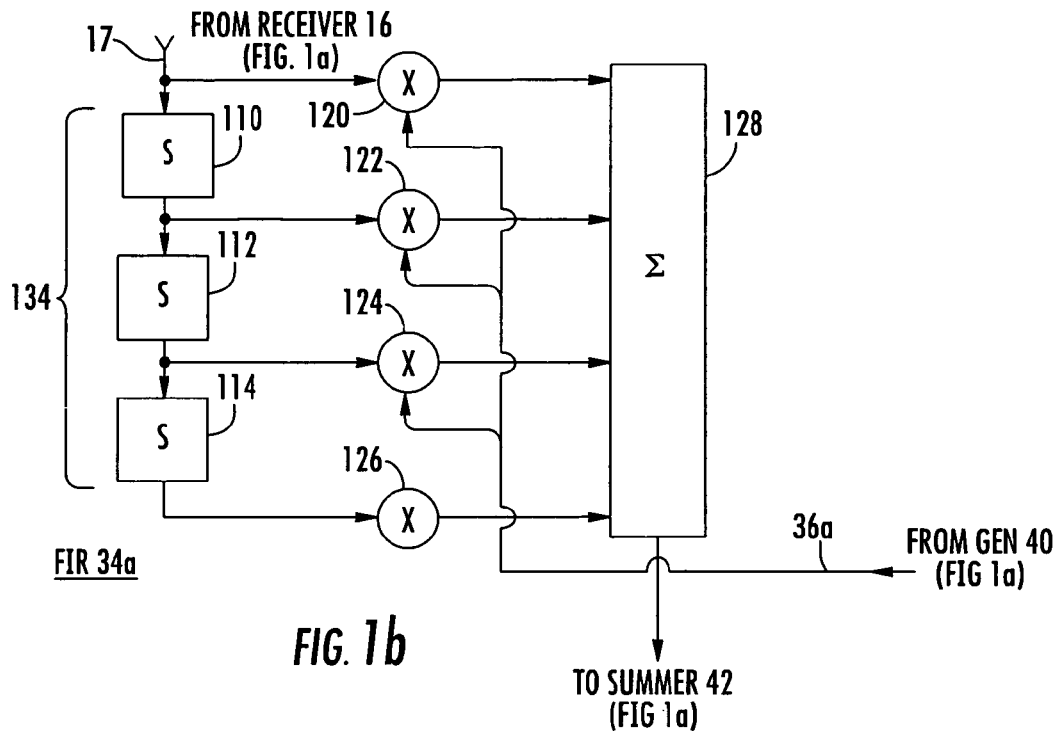
Figure 1C:
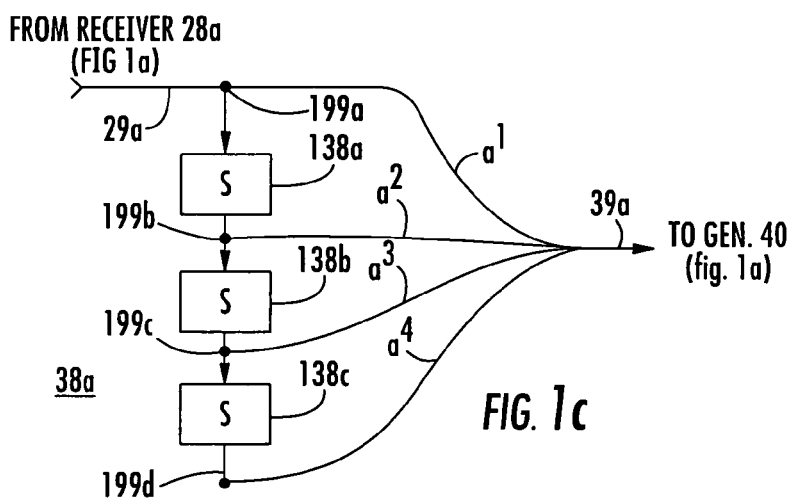
Figure 4:
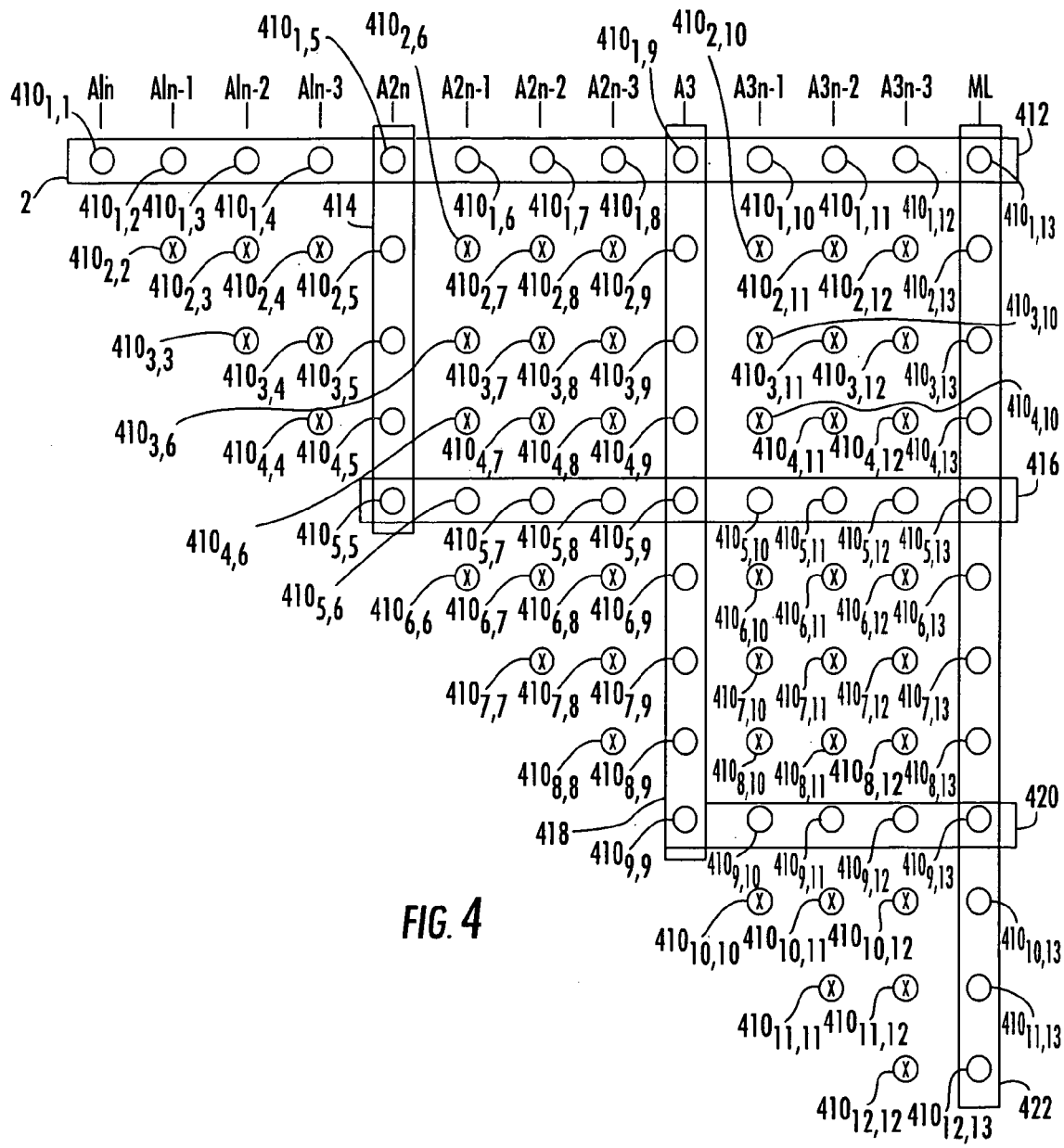
FIG. 4 is a skeletonized diagram illustrating the locations of correlators which may perform superfluous correlations in the arrangement of FIG. 3a or 4 when the received signal samples are mutually delayed relative to each other.

In some cases, it may be desired to determine intermediate weighting coefficients for a system such as that of FIGS. 1a, 1b and 1c, using the correlation array of FIG. 3a. In a case such as that of FIG. 1a, some of the input vectors to the correlator array are time-shifted versions of the same input signal. Suppose, for example, that FIG. 4 is a simplified or skeletonized representation of the correlator array, in this case similar to that of array 240a of FIG. 3a, but including a larger number of correlators. In FIG. 4, each correlator of the array is illustrated by a circle 410. Along the top of the array, the input signals are designated $A_{1n}$, $A_{1n-1}$ ... $A_{1n-3}$, $A_{2n}$, $A_{2n-1}$ ... $A_{2n-3}$, $A_{3n}$, $A_{3n-1}$, $A_{3n-2}$ ... $A_{3n-3}$, and the main signal ML, where $A_{1n}$, $A_{2n}$, $A_{3n}$, and ML are independent signals, and where the other input signals are delayed versions thereof. In FIG. 4, open circles 410, such as the circle representing correlator $410_{1,1}$, represent those correlations which must be performed, and those circles 410 marked with crosses, such as the circle representing correlator $410_{2,3}$, represent supernumerary or duplicative correlations.

As illustrated in the array of FIG. 4, the correlations necessary to the required correlations form distinct patterns or structures, and these structures are surrounded by rectangles for emphasis. The desired end result of the correlation portion of the formation of the intermediate weighting signals is the correlation of each independent input signal with each other independent input signal. Thus, the currently applied signal $A_{1n}$ is autocorrelated in correlator $410_{1,1}$. Since the signal at any moment is not necessarily the same as the signal at the next moment, even in the same channel, the current signal must also be correlated with the older or delayed signal in the same channel, which corresponds to correlations represented by correlators $410_{11}$, $410_{12}$, and $410_{13}$. Independent signal $A_{1n}$ must also be correlated with independent signal $A_{2n}$ (correlator $410_{1,5}$) and with the signals $A_{2n-1}$ ... $A_{2n-3}$ delayed therefrom (correlators $410_{1,6}$, $410_{1,7}$ and $410_{1,8}$), and also with independent signal $A_{3n}$ and its delayed versions $A_{3n-1}$, $A_{3n-2}$, and $A_{3n-3}$, which is accomplished in correlators $410_{1,9}$, $410_{1,10}$, $410_{1,11}$ and $410_{1,12}$, and finally, independent input signal $A_{1n}$ is correlated with the main signal in correlator $410_{1,13}$. Thus, the correlations of input signal $A_{1n}$ with all other input signals are performed in the upper row of correlators of FIG. 4, and those correlators are therefore surrounded by a horizontally oriented box 412 to indicate their relationship.

In FIG. 4, autocorrelator $410_{2,2}$ is not needed because the correlation of input signal $A_{1n-1}$ with itself is the same as the autocorrelation of input signal $A_{1n}$ with itself, which is performed in correlator $410_{1,1}$. Thus, a cross appears in correlator $410_{2,2}$. indicating that it is not necessary. Similarly, autocorrelators $410_{3,3}$, $410_{4,4}$, $410_{6,6}$, ... $410_{12,12}$ are not necessary and are therefore designated by crosses.

The correlations performed by correlators $410_{2,3}$, $410_{2,4}$ and $410_{3,4}$ of FIG. 4 are likewise redundant, because they are the correlations of mutually delayed samples of the input signal, which are already available from the correlators of block 412. The correlators of vertically-oriented block 414 of FIG. 4, namely $410_{1,5}$, $410_{2,5}$, $410_{3,5}$, $410_{4,5}$ and $410_{5,5}$, represent the necessary correlations of independent signal $A_{2n}$ with itself, and with all the signals related to input signal $A_{1n}$ and its delayed versions. The correlators of horizontally-oriented block 516 correspond, in a way, with the correlators of the upper row (of block 410), in that they represent the correlation of independent signal $A_2$, with itself (correlator $410_{5,5}$) and with all other signals to the right. Following the same pattern, a vertical block 418 surrounds those correlators producing required correlations between independent input signal $A_{3n}$ and all input signals to its left, and a horizontal block 420 surrounds those correlators producing required correlations between independent input signal $A_{3n}$ and all signals to its right. Lastly, a vertically oriented block 422 surrounds all those correlators required for correlating main input signal ML with all the signals to its left. As illustrated in FIG. 4, 45 correlators (those without a cross designation) out of 90 are actually required, and an additional 45 (those designated by crosses) are not necessary and may be dispensed with.

Figure 5:
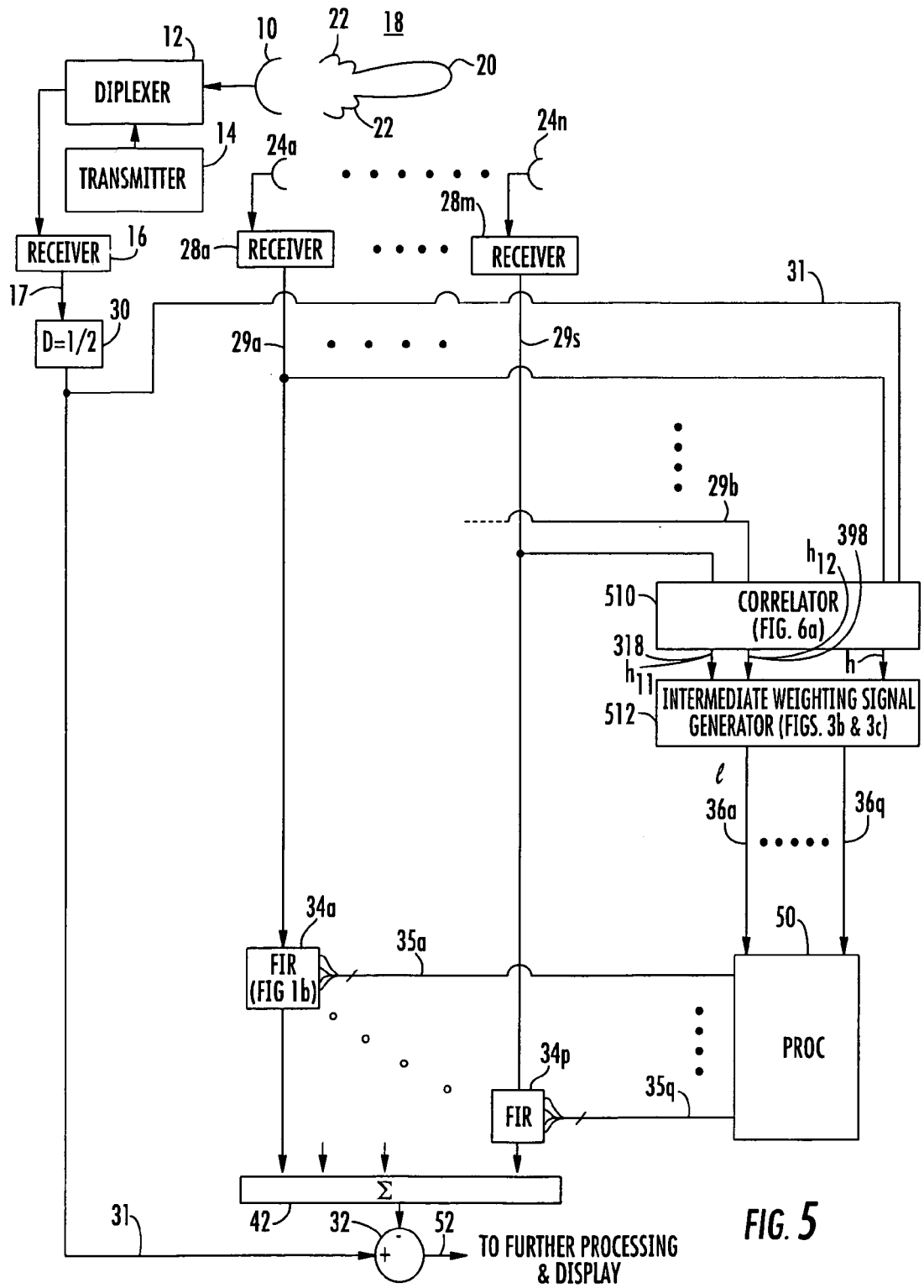
FIG. 5 is a simplified block diagram of a radar system with sidelobe cancellation, similar to that of FIG. 1a, in which the delay elements are incorporated into the correlators, whereby each of multiple sets of received signals includes mutually delayed samples.

FIG. 5 is a simplified block diagram of a radar beamformer or sidelobe canceller, simplified according to an aspect of the invention by eliminating the redundancies identified in FIG. 4. Those elements of FIG. 5 corresponding to elements of FIG. 1a are designated by like reference numerals. In FIG. 5, the received signals produced by receivers 28a .... 28m are applied over paths 29a ... 29s to inputs of a correlator block 510, which is illustrated in more detail in FIGS. 6a and 6b. Correlator block 510 of FIG. 5 produces the correlation coefficients (the h's) required for application to intermediate weighting signal generator 512 of FIG. 5, which in turn produces the intermediate weighting signals (the l's) for application to processor 50.

Correlator block 510 of FIG. 5 performs the correlations required to produce $h_{1,1}$, $h_{1,2}$, $h_{1,3}$ ... $h_{1,13}$, from a plurality of independent received signals arriving over paths 29a ... 29s, but which, for each independent signal, requires mutual delays.

Figure 6A:
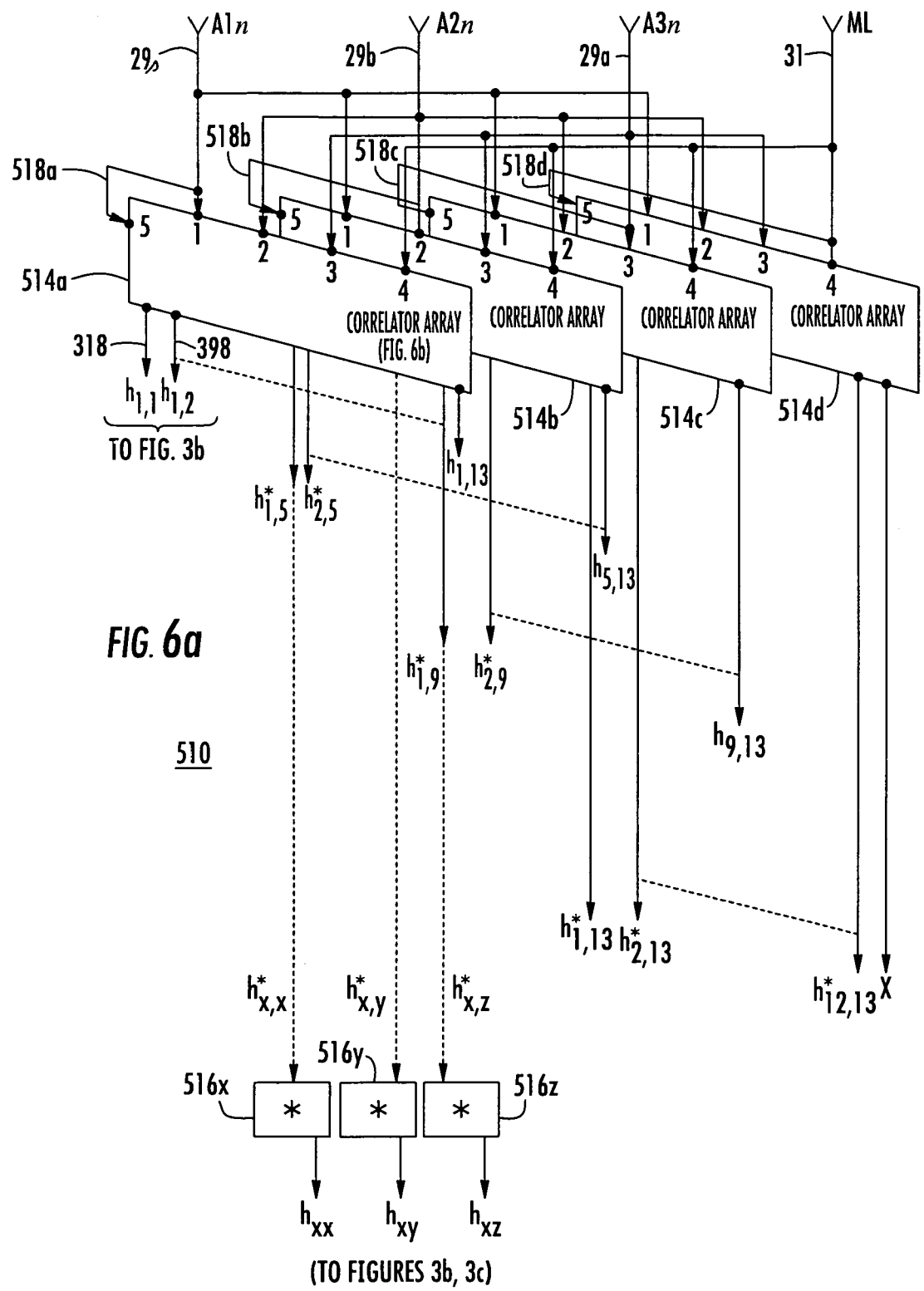
FIG. 6a is a simplified block diagram of the correlator arrangement of FIG. 4.

FIG. 6a is a simplified block diagram of correlator 510 of FIG. 5. In FIG. 6a, elements corresponding to those of FIG. 5 are designated by like reference numerals. As illustrated in FIG. 6a, correlator 510 of FIG. 5 is broken into a plurality of correlator arrays or sections 514a, 514b, 514c, and 514d, each of which includes a plurality of input ports 1, 2, 3, 4 and 5. Also illustrated in FIG. 6a are four input data paths 31, 29s, 29b and 29a, carrying the ML, and $A_{1n}$, $A_{2n}$, and $A_{3n}$ signals, respectively.

In FIG. 6a, signals $A_{1n}$ arriving on data path 29s are applied to input ports 1 of each of correlator arrays 514a, 514b, 514c and 514d, and are also applied to input port 5 of correlator array 514a. Signals $A_{2n}$ arriving on data path 29b are applied to input ports 2 of each of the four correlator arrays 514, and to input port 5 of correlator array 514b. Signals $A_{3n}$ arriving on data path 29a are applied to input ports 4 of each of the four correlator arrays 514, and to input port 5 of correlator array 514c. ML signals arriving on data path 31 are applied to input ports 4 of each of the four correlator arrays 514, and to input port 5 of correlator array 514d. The signal applied to input port 5 of a correlator array 514 determines which autocorrelation coefficient is produced. For example, correlator array 514a produces the autocorrelation of $A_{1n}$. As described below, each correlator array 514 produces the desired correlation coefficients h. More particularly, correlator array 514a of FIG. 5 produces $h_{1,1}$, the autocorrelation of signals $A_{1n}$ applied to its input port 5, and also produces cross-correlations between $A_{1n}$ and each of $A_{2n}$, $A_{3n}$ and ML. Correlator array 514d produces $h_{1,13}*$, the complex conjugate of the desired autocorrelation of signal ML, as well as the complex conjugates of the desired cross-correlations between ML and each of $A_{1n}$, $A_{2n}$ and $A_{3n}$. Correlator arrays 514b and 514c each produce an intermixture of the desired correlation coefficients and the complex conjugates thereof. When a correlator array of FIG. 6a produces the desired (auto) correlation coefficient directly, it is coupled directly, as by data paths 318 and 398 at the outputs of correlator array 514a, for use by the processor of FIGS. 3b and 3c. When a correlator array 514 of FIG. 6a produces the complex conjugate of the desired correlation coefficient, it is coupled to the processor of FIGS. 3b and 3c by way of a further complex conjugate operator, a plurality of which are represented by three complex conjugate operator blocks 516x, 516y and 516z in FIG. 6a.

Figure 6B:
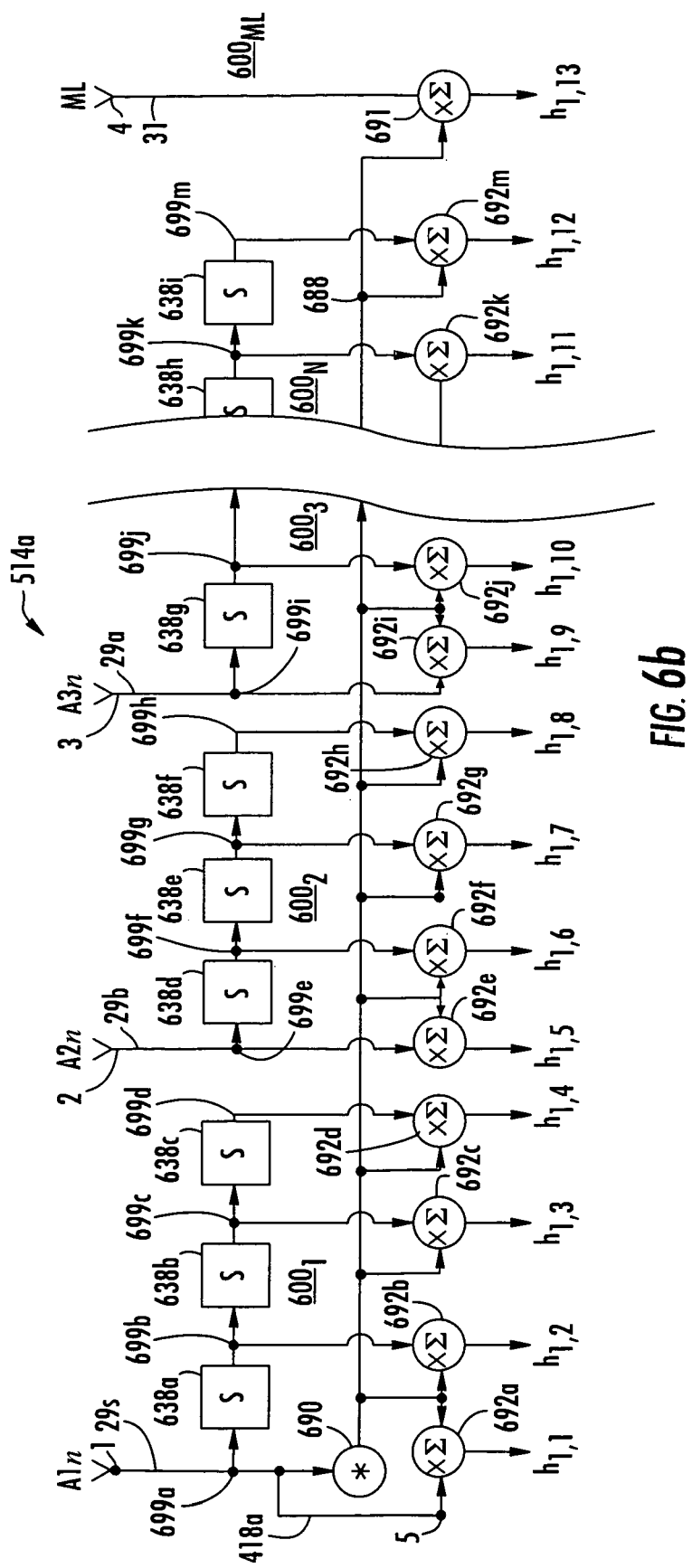

FIG. 6b illustrates details of one embodiment of a correlator array 514 of FIG. 6a. For definiteness, FIG. 6b represents correlator array 514a of FIG. 6a, and elements of FIG. 6b corresponding to those of FIG. 6a are designated by like reference numerals. In FIG. 6b, correlator array 514a includes subsets of correlators designated $600_1$, $600_2$, $600_3$, ... $600_N$, $600_{ML}$. Each correlator set $600_X$ (except set $600_{ML}$) includes a plurality of shift registers forming a tapped delay line, and a plurality of summing multipliers, one of which is associated with each tap. Each correlator set $600_X$ is also associated with a complex conjugate (*) circuit 690, which therefore forms part of each of each subset of correlators. In FIG. 6b, signals $A_{1n}$ arriving over path 29s are applied by way of port 5 to complex conjugate circuit 690 for generating the complex conjugate (*) of the current $A_{1n}$ signal on a path 688, and the $A_{1n}$ signal is also applied by way of port 1 and a tap 699a to a delay element in the form of a shift register (S) 638a, which is part of correlator subset $600_1$. The $A_{1n}$ signal at tap 699a is applied to a XΣ 692a together with the * signal from circuit 690, to produce autocorrelation coefficient $h_{11}$. The delayed output from S 638a is applied by way of a tap 699b to the inputs of a XΣ 692b and an S 638b. Summing multiplier 692b produces correlation signal $h_{12}$. The twice-delayed signal from S 638b is made available at tap 699c to a further S 638c and to XΣ 692c. Summing multiplier 692c produces $h_{13}$ from the * signal on path 688 and the delayed signal at tap 699c. the thrice-delayed signal from S 638c is applied by way of tap 699d to XΣ 692d together with * signal from path 688, to produce $h_{14}$. Thus, correlator subset $600_1$, produces $h_{11}$, $h_{12}$, $h_{13}$ and $h_{14}$.

Similarly, independent received signal $A_{2n}$ is applied over data path 29b and port 2, and by way of a tap 699e to inputs of a XΣ 692e and an S 638d of correlator subset $600_2$. Summing multiplier 692e also receives the * signal, and produces $h_{15}$. The delayed output signal from S638d passes in succession through S 638e and S 638f, and is made available at taps 699f, 699g and 699h to XΣ 692f, 692g and 692h, for generating $h_{16}$, $h_{17}$ and $h_{18}$. The remainder of the structure will be apparent from the above description, except that main signal ML is applied over data path 31 to a first input of a summing multiplier 691, together with the * signal from circuit 690, to produce correlation coefficient $h_{1,13}$. Correlator subset $600_{ML}$ therefore includes only $x\Sigma$ 691.

Comparison of FIGS. 6a and 6b shows that the only difference in operation among correlator arrays 514a, b, c and d aries from the application of a different one of input signals $A_{1n}$, $A_{2n}$, $A_{3n}$ and ML to input port 5. When signals $A_{2n}$ are applied to input port 5 instead of signals $A_{1n}$, the cross-correlations of signals $A_{1n}$ with $A_{2n}$ are produced as complex conjugates of the desired cross-correlations, while the autocorrelation of signals $A_{2n}$, and the cross-correlations of signals $A_2$ with $A_{3n}$ and with ML are produced directly. Thus, the cross-correlations of signals $A_{1n}$ with $A_{2n}$ are passed through a complex conjugate circuit such as 516 of FIG. 6a before being applied to a processor for generating intermediate weighting signals. When signal $A_3$ is applied to input port 5, the cross-correlations of signals $A_{1n}$ and $A_{2n}$ with $A_3$, are produced as complex conjugates, and the autocorrelations of signals $A_{3n}$, and the cross-correlation of signals $A_{3n}$ with ML, are produced directly. When signals ML are applied to input port 5, all the $h_s$ are produced as complex conjugates of the desired $h_s$. As mentioned, when the signal produced at an output port of a correlator array 514 of FIG. 6b is the complex conjugate of the desired signal, a complex conjugate operation (blocks 516 of FIG. 6a) produces the desired signal.

Other embodiments of the invention will be apparent to those skilled in the art. In particular, processing may be accomplished in analog or digital form, or an intermixture thereof. Also, while three shift registers 638 and four taps 699 are illustrated in FIG. 6b for processing each independent auxiliary signal, more or fewer delays may be used, to provide the desired number of correlation coefficients, as needed for the various FIR filters in FIG. 6a. The number of stages may be different from filter to filter.

What is claimed is:

1. A sidelobe canceler, comprising:

first transducing means forming a beam for preferentially receiving main signals from a particular direction, and also forming sidelobes by which unwanted signals may be received from directions other than said particular direction;

an integer number, which integer number may be equal to unity, of auxiliary transducing means, located adjacent to said first transducing means, each of said auxiliary transducing means being for receiving ancillary signals from said particular direction and from said other directions;

controllable weighting means coupled to each of said auxiliary transducing means, for weighting said ancillary signals received therefrom in accordance with weight signals applied to each of said weighting means, to form weighted auxiliary signals;

summing means coupled to said first transducing means and to said weighting means, for subtracting from said main signals the sum of said weighted auxiliary signals, to thereby form said main signals with reduced levels of said unwanted signals; and weight establishing means coupled to said first transducing means and to said auxiliary transducing means, and to said controllable weighting means, said weight establishing means further comprising:

(a1) a plurality of sets of correlators, each of said sets of correlators including a plurality of first input ports, one of which is coupled to each of said main and auxiliary transducing means for receiving said main and auxiliary signals, each of said sets of correlators also including a second input port, the number of said sets of correlators being equal to the number of said transducing means, and said second input port of each of said sets of correlators being coupled to a different one of said transducing means, each of said sets of correlators including a plurality of subsets of correlators, the number of said subsets of correlators in each of said sets of correlators being equal to the number of said first input ports of said set of correlators, each of said subsets of correlators being coupled to one of said first input ports of the associated set of correlators, and all of said subsets of correlators of each of said sets of correlators being coupled to said second input port of the associated set of correlators by way of complex conjugating means, whereby each of said correlators operates on the complex conjugate of the transduced signal applied to said second input port of the associated set of correlators, each of said subsets of correlators also including a cascade of a plurality of delay means, the number of which delay means in each cascade is one less than the number of said weight signals applied to the corresponding one of said controllable weighting means, which number of delay means may be equal to zero, each of said cascades of said plurality of delay means having an input end coupled to receive transduced signals from one of said first input ports of the associated one of said sets of correlators, each of said cascades of said plurality of delay means having associated therewith one tap for each of said delay means except for the first delay means of each subset, which has associated therewith two taps, each of said taps of any one of said subsets of delay means producing identical signals, mutually delayed from each other;

(a2) a plurality of summing multipliers associated with each of said subsets of correlators, equal in number to the number of said weight signals applied to the associated one of said controllable weighting means, each of said summing multiplier means including a first input port coupled to one of said taps associated with the associated one of said cascades of delay means for receiving cascade signal therefrom, and a second input port coupled by way of said complex conjugate means to said second input port of the associated one of said sets of correlators for receiving complex conjugate signal therefrom, for producing correlation coefficients representing the correlation of said complex conjugate signal applied to said second input port of said summing multiplier means with said cascade signal applied to said first input port of said summing multiplier means;

b. a plurality of first processing means, each of said first processing means including first and second input ports and an output port, for forming at said output port an intermediate weighting coefficient representing the quotient of a signal applied to said first input port divided by a signal applied to said second input port;

c. a plurality of second processing means, each of said second processing means including first, second and third input ports, and first and second output ports, for producing at said first output port a signal representing the product of the signal applied to said first input port multiplied by the conjugate of the signal applied to said second input port, and for producing at said second output port a signal representing a difference, wherein said difference is the difference between the signal applied to said third input port and a second product, wherein said second product is the product of three factors, which are (i) the signal applied to said first input port, (ii) the signal applied to said second input port, and (iii) the conjugate of the signal applied to said second input port;

d. a plurality of third processing means, each of said third processing means including first, second and third input ports, and an output port, for producing at said output port a signal representing a difference, wherein said difference is the difference between the signal applied to said third input port and a third product, wherein said third product is the product of the signal applied to said first input port multiplied by the signal applied to said second input port;

e. coupling means coupled to said correlators and to said first, second and third processing means for arranging said processing means in groups defined by ranks, each of which is associated with at least one of said sets of correlators, each of said ranks of processing means being coupled for receiving correlation coefficients from at least one of said sets of correlators, and also being coupled for receiving intermediate weighting coefficients produced by all higher rank of processors, if any, within the highest rank, coupling one of said correlation coefficients from one of said sets of correlators, in common, to said second input port of said first processing means, and coupling said correlation coefficients from one of said sets of correlators to said first input port of said first processing means, thereby producing at said output port of said first processing means the highest rank of intermediate weighting coefficients, and within each rank of said processing means except said highest rank, coupling rows of processors in at least first rows, and last and intermediate rows, if present, where a single processor in a rank containing only one row is deemed to be in both first and last rows of its rank, said coupling means, within each rank except said highest rank, coupling said first input port of said second processing means of said first row to said second output port of said second processing means of said last row of the next higher rank, said second input port of said second processing means of said first row to receive said intermediate weighting signal from the next higher rank, said third input port of said second processing means of said first row to receive one of said correlation coefficients from one of said sets of correlators, said first output port of said second processing means of said first row in common to said first input ports of said third processing means of said first row, said second output port of said second processing means of said first row to one of (i) said third input port of a second processing means of the next row within said rank and (ii) in common to said second input ports of said first processing means of said rank, said second input port of said third processing means of said first row to receive said intermediate weighting signal from said next higher rank, said third input port of said third processing means of said first row to receive said correlation coefficient from a correlator of said set of correlators, said output port of said third processing means of said first row to one of (i) said third input port of a third processing means of the next row within said rank and (ii) to said first input port of said first processing means of said rank, said first input port of said second processing means of said last row to receive said correlation coefficient from a correlator of one of said sets of correlators, said second input port of said second processing means of said last row to receive said intermediate weighting signal from said output port of a first processing means of said highest rank, said third input port of said second processing means of said last row to one of (i) said second output port of a second processing means on a previous row and (ii) said output port of a first processing means of the next higher rank, said first output port of said second processing means of said last row in common to said first input port of said third processing means of said last row, said second output port of said second processing means of said last row in common to said second input ports of said first processing means of said rank, said second input port of said third processing means of said last row to receive said intermediate weighting signal from said output port of one of said first processing means of said highest rank, said third input port of said third processing means of said last row to one of (i) said output port of said third processing means of the previous row and (ii) and to receive a correlation coefficient from one of said sets of correlators, said coupling means further coupling, within a rank, said first input port of said second processing means of one of said intermediate rows to said second output port of said second processing means of said last row of a higher rank, said second input port of said second processing means of one of said intermediate rows to receive said intermediate weighting coefficient from said output port of said first processing means of a higher rank, said third input port of said second processing means of an intermediate row to said second output port of said second processing means of the previous row, said first output port of said second processing means of an intermediate row in common to at least one of said first input ports of said third processing means of the same intermediate row, said second output port of said second processing means of an intermediate row to said third input port of said second processing means of the next row, said second input port of said third processing means of an intermediate row to receive said intermediate weighting coefficient from said output port of one of said first processing means of a higher rank, said third input port of said third processing means of an intermediate row to said output port of said third processing means of the previous row, and said output port of said third processing means of an intermediate row to said third input port of said third processing means of the next row; and f. means for processing said intermediate weighting signals for generating weight signals, and for applying said weight signals to said weighting means.

2. A canceler according to claim 1, wherein each of said transducing means comprises antenna means.

3. A sidelobe canceler, comprising:

first transducing means forming a beam for preferentially receiving main signals from a particular direction, and also forming sidelobes by which unwanted signals may be received from directions other than said particular direction;

an integer number, which integer number may be equal to unity, of auxiliary transducing means, located adjacent to said first transducing means, each of said auxiliary transducing means being for receiving ancillary signals from said particular direction and from said other directions;

controllable weighting means coupled to each of said auxiliary transducing means, for weighting said ancillary signals received therefrom in accordance with weight signals applied to each of said weighting means, to form weighted auxiliary signals;

summing means coupled to said first transducing means and to said weighting means, for subtracting from said main signals the sum of said weighted auxiliary signals, to thereby form said main signals with reduced levels of said unwanted signals; and weight establishing means coupled to said first transducing means and to said auxiliary transducing means, and to said controllable weighting means, said weight establishing means further comprising:

a. a plurality of correlators, each of said correlators including first and second input ports and an output port at which correlation coefficients are produced, said correlators being arranged in groups of different rank, each of said groups including a different number of correlators, with a group of correlators of first rank having the largest number of correlators, and within each rank, a first one of said correlators having its first input port coupled to said first transducing means and its second input port coupled to a particular one of said auxiliary transducing means, a second one of said correlators having both its first and second input ports coupled to said particular one of said auxiliary transducing means whereby said correlation coefficient produced by said second one of said correlators is an autocorrelation coefficient, and each of the remainder, if any, of said correlators having their second input ports coupled to said particular one of said auxiliary transducing means, and said first input ports coupled to a different one of said auxiliary transducing means other than said particular one, and within a selected rank in which one of said auxiliary transducing means is connected to both first and second input ports of said second one of said correlators of said selected rank, said one of said auxiliary transducing means is coupled to all correlators of said selected rank, and to at least one correlator of each rank greater than said selected rank;

b. a plurality of first processing means, each of said first processing means including first and second input ports and an output port, for forming at said output port an intermediate weighting coefficient representing the quotient of a signal applied to said first input port divided by a signal applied to said second input port;

c. a plurality of second processing means, each of said second processing means including first, second and third input ports, and first and second output ports, for producing at said first output port a signal representing the product of the signal applied to said first input port multiplied by the conjugate of the signal applied to said second input port, and for producing at said second output port a signal representing a difference, wherein said difference is the difference between the signal applied to said third input port and a second product, wherein said second product is the product of three factors, which are (i) the signal applied to said first input port, (ii) the signal applied to said second input port, and (iii) the conjugate of the signal applied to said second input port;

d. a plurality of third processing means, each of said third processing means including first, second and third input ports, and an output port, for producing at said output port a signal representing a difference, wherein said difference is the difference between the signal applied to said third input port and a third product, wherein said third product is the product of the signal applied to said first input port multiplied by the signal applied to said second input port;

e. coupling means coupled to said correlators and to said first, second and third processing means for arranging said processing means in groups defined by ranks associated with said ranks of said correlators, each of said ranks of processing means being coupled for receiving correlation coefficients from the group of correlators of the corresponding rank, and also being coupled for receiving intermediate weighting coefficients produced by all higher rank of processors, if any, and for, within the highest rank of said processing means, coupling said autocorrelation coefficient from said highest rank of correlators, in common, to said second input port of said first processing means, and coupling said correlation coefficients from said highest rank of correlators to said first input port of said first processing means, thereby producing at said output port of said first processing means the highest rank of intermediate weighting coefficients, and within each rank of said processing means except said highest rank, coupling rows of processors in at least first rows, and last and intermediate rows, if present, where a single processor in a rank containing only one row is deemed to be in both first and last rows of its rank, said coupling means, within each rank except said highest rank, coupling said first input port of said second processing means of said first row to said second output port of said second processing means of said last row of the next higher rank, said second input port of said second processing means of said first row to receive said intermediate weighting signal from the next higher rank, said third input port of said second processing means of said first row to receive said autocorrelation coefficient from one of said correlators of the corresponding rank, said first output port of said second processing means of said first row in common to said first input ports of said third processing means of said first row, said second output port of said second processing means of said first row to one of (i) said third input port of a second processing means of the next row within said rank and (ii) in common to said second input ports of said first processing means of said rank, said second input port of said third processing means of said first row to receive said intermediate weighting signal from said next higher rank, said third input port of said third processing means of said first row to receive said correlation coefficient from a correlator of said corresponding rank, said output port of said third processing means of said first row to one of (i) said third input port of a third processing means of the next row within said rank and (ii) to said first input port of said first processing means of said rank, said first input port of said second processing means of said last row to receive said autocorrelation coefficient from a correlator of said highest rank, said second input port of said second processing means of said last row to receive said intermediate weighting signal from said output port of a first processing means of said highest rank, said third input port of said second processing means of said last row to one of (i) said second output port of a second processing means on a previous row and (ii) said output port of a first processing means of the next higher rank, said first output port of said second processing means of said last row in common to said first input port of said third processing means of said last row, said second output port of said second processing means of said last row in common to said second input ports of said first processing means of said rank, said second input port of said third processing means of said last row to receive said intermediate weighting signal from said output port of one of said first processing means of said highest rank, said third input port of said third processing means of said last row to one of (i) said output port of said third processing means of the previous row and (ii) and to receive said correlation coefficient from corresponding rank of correlators, said coupling means further coupling, within a rank, said first input port of said second processing means of one of said intermediate rows to said second output port of said second processing means of said last row of a higher rank, said second input port of said second processing means of one of said intermediate rows to receive said intermediate weighting coefficient from said output port of said first processing means of a higher rank, said third input port of said second processing means of an intermediate row to said second output port of said second processing means of the previous row, said first output port of said second processing means of an intermediate row in common to at least one of said first input ports of said third processing means of the same intermediate row, said second output port of said second processing means of an intermediate row to said third input port of said second processing means of the next row, said second input port of said third processing means of an intermediate row to receive said intermediate weighting coefficient from said output port of one of said first processing means of a higher rank, said third input port of said third processing means of an intermediate row to said output port of said third processing means of the previous row, and said output port of said third processing means of an intermediate row to said third input port of said third processing means of the next row; and f. means for processing said intermediate weighting signals for generating weight signals, and for applying said weight signals to said weighting means.

* * * * *